United States Patent [19]

Balliello

[11] 4,453,943
[45] Jun. 12, 1984

[54] SOLID FORMULATIONS OF ANIONIC DYES

[75] Inventor: Paolo Balliello, Rheinfelden, Fed. Rep. of Germany

[73] Assignee: Ciba-Geigy Corporation, Ardsley, N.Y.

[21] Appl. No.: 478,005

[22] Filed: Mar. 23, 1983

[30] Foreign Application Priority Data

Apr. 2, 1982 [DE] Fed. Rep. of Germany ....... 3212408

[51] Int. Cl.³ ............................................. D06P 67/02
[52] U.S. Cl. ......................................... 8/524; 8/499; 8/526; 8/606; 8/676; 8/681; 8/917; 8/924
[58] Field of Search .................... 8/499, 524, 526, 606

[56] References Cited

U.S. PATENT DOCUMENTS

| | | | |
|---|---|---|---|
| 3,764,262 | 10/1973 | Hildebrand et al. | 8/606 |
| 4,105,401 | 8/1978 | Koci et al. | 8/524 |
| 4,295,851 | 10/1981 | Neumann et al. | 8/524 |
| 4,314,815 | 2/1982 | Mollet | 8/524 |

Primary Examiner—A. Lionel Clingman
Attorney, Agent, or Firm—Edward McC. Roberts

[57] ABSTRACT

The invention relates to solid dye formulations which, in addition to containing at least one anionic dye, at least one anionic dispersant, a non-ionic emulsifier and optionally further ingredients, contains 0.1 to 10% by weight, based on the final formulation, of a quaternary ammonium salt of the formula I

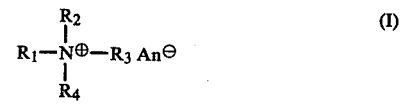

wherein $R_1$ is a $C_8$–$C_{20}$alkyl or $C_8$–$C_{20}$alkenyl group, each of $R_2$, $R_3$ and $R_4$ independently of one another is a $C_1$–$C_4$alkyl group, and $An^\ominus$ is an anion.

Such formulations, which have good cold water solubility, are suitable for dyeing or printing textile material e.g. of wool or polyamide.

13 Claims, No Drawings

SOLID FORMULATIONS OF ANIONIC DYES

The present invention relates to solid dye formulations, to their preparation, and to their use for dyeing or printing textile material.

Solid formulations of anionic dyes are already known. They contain e.g. the dye, a dispersant, usually an anionic dispersant, as well as other ingredients such as extenders, wetting agents etc. However, these formulations often have defects such as insufficient cold water solubility, poor redispersibility and/or wettability in water.

It is the object of the present invention to provide solid dye formulations which do not have the defects referred to above.

It has been found that this object is accomplished with dye formulations which, in addition to containing an anionic dye, an anionic dispersant and a non-ionic emulsifier, contain 0.1 to 10% by weight, based on the final formulation, of a quaternary ammonium salt of the formula I

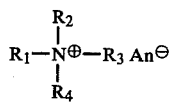

wherein $R_1$ is a $C_8$–$C_{20}$alkyl or $C_8$–$C_{20}$alkenyl group, each of $R_2$, $R_3$ and $R_4$ independently of one another is a $C_1$–$C_4$alkyl group, and $An^\ominus$ is an anion.

Accordingly, the present invention relates to solid dye formulations comprising at least one anionic dye, at least one anionic dispersant, a non-ionic emulsifier and optionally further ingredients, which formulations additionally comprise 0.1 to 10% by weight, based on the weight of the final formulation, of a quaternary ammonium salt of the formula I.

Compared with known dye formulations which do not contain a quaternary ammonium salt, these formulations have a better cold water solubility and wettability, and they are also more readily soluble in warm water. Further advantages compared with the known formulations of these dyes are the increased bulk density of the formulations of the invention and the possibility of drying them by spray drying, whereas up to now it has in many cases been necessary to carry out drying in a paddle drier, which often resulted in an undesired crystal modification.

It is surprising that the cationic compounds of the formula I do not lead to the formation of water-insoluble deposits either with the anionic dye or with the anionic dispersant and, in addition, that they improve the cold water solubility of anionic dyes. It is known that quaternary ammonium salts tend to form deposits in the present of anionic compounds. Reference is made in this connection e.g., to "ARQUADS", a house publication of the firm of Armour Hess Chemicals Limited (1963).

The dye formulations of the present invention have preferably the following composition:
(a) 30–90% by weight of an anionic dye,
(b) 0.1 to 10% by weight of a quaternary ammonium salt of the formula I,
(c) 1–20% by weight of at least one anionic dispersant,
(d) 1–20% by weight of a non-ionic emulsifier,
and optionally further ingredients.

Examples of suitable anionic dyes are nitro, aminoketone, ketone-imine, methine, nitrodiphenylamine, quinoline, aminonaphthoquinone or coumarin dyes, and especially anthraquinone and azo dyes such as monoazo and disazo dyes.

These dyes contain at least one anionic water-solubilising group, e.g. a carboxylic acid group or, in particular, a sulfonic acid group. Acid dyes are usually in the form of their salts, e.g. as lithium, sodium, potassium or ammonium salts. Preferred anionic dyes are those which do not contain fibre-reactive radicals.

In the quaternary ammonium compounds of the formula I, the alkyl or alkenyl group $R_1$ may be straight-chain or branched and is e.g. the n-octyl, iso-octyl, decyl or oleyl group. $R_1$ is preferably a $C_{12}$–$C_{18}$alkyl group, e.g. the lauryl, stearyl or, in particular, the cetyl group.

Each of $R_2$, $R_3$ and $R_4$ independently of one another is a $C_1$–$C_4$alkyl group, e.g. the methyl, ethyl, n-propyl, isopropyl, n-butyl, isobutyl or tert-butyl group. $R_2$, $R_3$ and $R_4$ are each preferably the methyl or ethyl group.

Suitable anions $An^\ominus$ are the halide ions, e.g. the chloride, bromide or iodine ion. The quaternary ammonium salt of the formula I is preferably cetyl trimethylammonium chloride or cetyl trimethylammonium bromide.

The anionic dispersants are the conventional dispersants for anionic dyes, in particular condensation products of formaldehyde with aromatic sulfonic acids, or lignosulfonates. Mixtures of these dispersants may also be used.

Suitable non-ionic emulsifiers are preferably reaction products of ethylene oxide and/or propylene oxide with
(a) saturated or unsaturated fatty alcohols containing 6 to 20 carbon atoms,
(b) alkylphenols containing 4 to 12 carbon atoms in the alkyl moiety, or
(c) saturated or unsaturated fatty amines containing 14 to 20 carbon atoms, or
(d) saturated or unsaturated fatty acids containing 14 to 20 carbon atoms,
which reaction products preferably have a molecular weight of 1000 to 5000.

In addition, the formulations may contain further ingredients such as conventional extenders, e.g. dextrin, urea, or inorganic salts such as sodium chloride or sodium sulfate, as well as wetting agents such as nonylphenol diglycol ether sulfate or dodecylbenzene sulfonate, or also dust inhibitors, antifoams and/or binders.

Formulations having a particularly good cold water solubility have the following composition:
(a) 60–90% by weight of an azo or anthraquinone dye which contains sulfo groups;
(b) 0.1–3% by weight of cetyl trimethylammonium chloride or bromide,
(c) 1–10% by weight of a mixture of lignosulfonate and a condensate of naphthalenesulfonic acid and formaldehyde,
(d) 1–10% by weight of a reaction product of ethylene oxide and a saturated or unsaturated fatty alcohol containing 10 to 20 carbon atoms, said reaction product having a molecular weight of 3000 to 4000, and
(e) 0.1–5% by weight of an antifoam.

The solid dye formulations of this invention are prepared e.g. by suspending or dissolving at least one anionic dye in water with the addition of a quaternary ammonium salt of the formula I, an anionic dispersant or mixture of anionic dispersants, a non-ionic emulsifier, and optionally further ingredients, mixing or preferably grinding the components with one another and subsequently drying the mixture. Drying is preferably carried out in a spray drier.

The dyes may be used e.g. as dry products or as filter cakes, or also in the form of the synthesis solution or suspension.

If the components are ground, some of them may also only be added after the grinding procedure. It is also possible to mix initially only a portion of the components and then to add the rest, e.g. the dust inhibitor, at the conclusion, e.g. after drying.

The dye formulations of this invention are used for the preparation of dyebaths, padding liquors or printing pastes. They are suitable in particular for dyeing or printing textile material, e.g. made of wool or synthetic polyamide.

The invention is illustrated in more detail by the following Example, in which percentages are by weight.

Example 26.8 kg of the crude dye of the formula

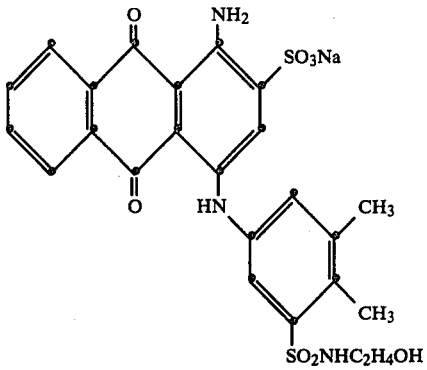

are suspended in about 20 liters of water. To this suspension are added 270 g of lignosulfonate, 1.07 kg of a reaction product of oleyl alcohol and ethylene oxide in the molar ratio of 1:80 (non-ionic emulsifier with a molecular weight of ~3790), 1.072 kg of a condensation product of naphthalenesulfonic acid and formaldehyde, 140 g of cetyl trimethylammonium chloride, and 270 g of an antifoam surfactant. This mixture is stirred to a homogeneous paste having a solids content of 46% and a pH of about 9.5. The suspension is then subjected to wet grinding and pumped for 5 to 6 hours through a Dyno mill. After the grinding procedure, the dye suspension is adjusted to the required final dye concentration by addition of sulfite lye (dry) and then spray dried, to give a solid dye formulation of the following composition:

86.00% of crude dye
0.86% of lignosulfonate
3.40% of non-ionic emulsifier
3.40% of a condensation product of naphthalenesulfonic acid and formaldehyde
0.45% of cetyl trimethylammonium chloride
0.85% of an antifoam surfactant
5.00% of residual moisture.

The formulation has a cold water solubility of 30 g/l, is readily wettable and redispersible, and is suitable for dyeing and printing textile materials of wool or polyamide.

The cold water solubility of the formulation is determined as follows (sprinkling in test):

Specific amounts of the dye formulations are each added to 200 ml of demineralised water of about 20° C. and stirred for 2 minutes (400 ml glass beaker; magnetic stirrer, 750 rpm). Each of the dye solutions is filtered through a paper filter (SS 1450 CV; diameter 7 cm) which is then washed with 50 ml of demineralised water. The cold water solubility is expressed as the maximum amount of dye in grams per liter which dissolves completely, i.e. which gives a solution that can be filtered without leaving any residue.

A formulation of the same composition as above, but without cetyl trimethylammonium chloride, has a cold water solubility of less than 1 g/l.

What is claimed is:

1. A solid dye formulation comprising at least one anionic dye, at least one anionic dispersant, a non-ionic emulsifier and optionally further ingredients, which formulation contains 0.1 to 10% by weight, based on the final formulation, of a quaternary ammonium salt of the formula I

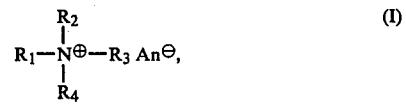

wherein $R_1$ is a $C_8$-$C_{20}$alkyl or $C_8$-$C_{20}$alkenyl group, each of $R_2$, $R_3$ and $R_4$ independently of one another is a $C_1$-$C_4$-alkyl group, and $An^\ominus$ is an anion.

2. A solid dye formulation according to claim 1, which comprises
   (a) 30–90% by weight of an anionic dye,
   (b) 0.1 to 10% by weight of a quaternary ammonium salt of the formula I,
   (c) 1–20% by weight of at least one anionic dispersant,
   (d) 1–20% by weight of a non-ionic emulsifier,
and optionally further ingredients.

3. A solid dye formulation according to claim 1, wherein the quaternary ammonium salt is a compound of the formula I, wherein $R_1$ is a $C_{12}$-$C_8$alkyl group and each of $R_2$, $R_3$ and $R_4$ is ethyl or methyl.

4. A solid dye formulation according to claim 3, wherein the quaternary ammonium salt is cetyl trimethylammonium chloride or cetyl trimethylammonium bromide.

5. A solid dye formulation according to claim 1, wherein the anionic dispersant is a condensation product of formaldehyde and an aromatic sulfonic acid, or a lignosulfonate.

6. A solid dye formulation according to claim 1, wherein the non-ionic emulsifier is a reaction product of ethylene oxide and/or propylene oxide with
   (a) saturated or unsaturated fatty alcohols containing 6 to 20 carbon atoms,
   (b) alkylphenols containing 4 to 12 carbon atoms in the alkyl moiety, or
   (c) saturated or unsaturated fatty amines containing 14 to 20 carbon atoms, or
   (d) saturated or unsaturated fatty acids containing 14 to 20 carbon atoms,
which reaction product has a molecular weight of 1000 to 5000.

7. A solid dye formulation according to claim 1, wherein the dye is an azo or anthraquinone dye containing at least one sulfo group.

8. A solid dye formulation according to claim 1, which contains an antifoam, a binder and/or a dust inhibitor as further ingredients.

9. A solid dye formulation according to claim 1, which comprises
   (a) 60-90% by weight of an azo or anthraquinone dye which contains sulfo groups,
   (b) 0.1-3% by weight of cetyl trimethylammonium chloride or bromide,
   (c) 1-10% by weight of a mixture of lignosulfonate and a condensate of naphthalenesulfonic acid and formaldehyde,
   (d) 1-10% by weight of a reaction product of ethylene oxide and a saturated or unsaturated fatty alcohol containing 10 to 20 carbon atoms, said reaction product having a molecular weight of 3000 to 4000, and
   (e) 0.1-5% by weight of an antifoam.

10. A process for the preparation of a solid dye formulation as claimed in claim 1, which comprises suspending or dissolving at least one anionic dye in water with the addition of a quaternary ammonium salt of the formula I, an anionic dispersant or mixture of anionic dispersants, a non-ionic emulsifier, and optionally further ingredients, mixing the components with one another and subsequently drying the mixture.

11. A process according to claim 10, wherein the aqueous suspension of the components is ground.

12. A process according to either claim 10 or claim 11, wherein drying is carried out by spray drying.

13. A dye formulation obtained by a process as claimed in any one of claims 10 to 12.

* * * * *